US011842059B2

(12) United States Patent
Walker

(10) Patent No.: US 11,842,059 B2
(45) Date of Patent: Dec. 12, 2023

(54) MEMORY SUB-SYSTEM ADDRESS MAPPING

(71) Applicant: Micron Technology, Inc., Boise, ID (US)

(72) Inventor: Robert M. Walker, Raleigh, NC (US)

(73) Assignee: Micron Technology, Inc., Boise, ID (US)

( * ) Notice: Subject to any disclaimer, the term of this patent is extended or adjusted under 35 U.S.C. 154(b) by 80 days.

(21) Appl. No.: 17/464,414

(22) Filed: Sep. 1, 2021

(65) Prior Publication Data

US 2023/0067601 A1 Mar. 2, 2023

(51) Int. Cl.
G06F 3/06 (2006.01)
G06F 12/02 (2006.01)
G06F 12/06 (2006.01)
G06F 12/0891 (2016.01)

(52) U.S. Cl.
CPC ............ *G06F 3/0635* (2013.01); *G06F 3/061* (2013.01); *G06F 3/068* (2013.01); *G06F 3/0611* (2013.01); *G06F 3/0613* (2013.01); *G06F 3/0638* (2013.01); *G06F 3/0644* (2013.01); *G06F 3/0659* (2013.01); *G06F 3/0661* (2013.01); *G06F 3/0679* (2013.01); *G06F 12/0238* (2013.01); *G06F 12/0653* (2013.01); *G06F 12/0891* (2013.01); *G06F 2212/608* (2013.01)

(58) Field of Classification Search
CPC ............... G06F 12/023; G06F 12/0238; G06F 12/0246; G06F 12/0292; G06F 3/061; G06F 3/0611; G06F 3/0613; G06F 3/0635; G06F 3/0638; G06F 3/0659; G06F 3/0679; G06F 3/068; G06F 3/0644; G06F 3/0661; G06F 12/23; G06F 12/238; G06F 12/246
See application file for complete search history.

(56) References Cited

U.S. PATENT DOCUMENTS 11,550,479 B1 * 1/2023 Shatsky .................. G06F 16/13
2010/0191913 A1 * 7/2010 Chlipala ............. G06F 12/0866
711/E12.017

(Continued)

OTHER PUBLICATIONS

Joint Management of CPU and NVDIMM for Breaking Down the Great Memory Wall by Wu (Year: 2020).*

(Continued)

*Primary Examiner* — Paul M Knight
(74) *Attorney, Agent, or Firm* — Brooks, Cameron & Huebsch, PLLC

(57) ABSTRACT

A method includes accessing a first memory component of a memory sub-system via a first interface, accessing a second memory component of the memory sub-system via a second interface, and transferring data between the first memory component and the second memory component via the first interface. The method further includes initially writing data in the first memory component via a first address window and accessing data in the second memory component via a second address window in response to caching the data in first memory component to the second memory component, wherein caching the data in the first memory component to the second component includes changing an address for the data from the first address window to the second address window.

16 Claims, 4 Drawing Sheets

(56) References Cited

U.S. PATENT DOCUMENTS

| | | | | |
|---|---|---|---|---|
| 2014/0126313 | A1* | 5/2014 | Wu | G11C 29/00 |
| | | | | 365/201 |
| 2019/0012111 | A1* | 1/2019 | Li | G06F 3/0685 |
| 2019/0114077 | A1 | 4/2019 | Kumar et al. | |
| 2019/0227720 | A1 | 7/2019 | Liu et al. | |
| 2019/0278701 | A1* | 9/2019 | Enz | G06F 12/0891 |
| 2020/0125290 | A1* | 4/2020 | Shah | G06F 3/0679 |
| 2020/0142597 | A1 | 5/2020 | Basham et al. | |
| 2020/0225868 | A1 | 7/2020 | Dalmatov et al. | |
| 2020/0319815 | A1* | 10/2020 | Dutta | G06F 12/0246 |
| 2020/0379922 | A1* | 12/2020 | Kumar | G06F 12/0813 |
| 2021/0096621 | A1* | 4/2021 | Agrawal | G06F 11/1004 |
| 2021/0160317 | A1 | 5/2021 | Portz et al. | |

OTHER PUBLICATIONS

Evaluation of Intel 3D-Xpoint NVDIMM Technology for Memory-Intensive Genomic Workloads by Waddington (Year: 2019).*

Linux Enterprise Servers Chapter 25 Persistent Memory by Suse Jan. 2021 (Year: 2021).*

Enabling Persistent Memory in the Storage Performance Development Kit (SPDK) by Intel (Year: 2019).*

Stealth-Persist: Architectural Support for Persistent Applications in Hybrid Memory Systems by Alwadi (Year: 2021).*

Using NVDIMM Persistent Memory Server Technology with Linux by Hewlett Packard (Year: 2017).*

NVDIMM-C: A Byte-Addressable Non-Volatile Memory Module for Compatibility with Standard DDR Memory Interfaces by Lee (Year: 2020).*

* cited by examiner

MEMORY SUB-SYSTEM ADDRESS MAPPING

TECHNICAL FIELD

Embodiments of the disclosure relate generally to memory sub-systems, and more specifically, relate to memory sub-system address mapping.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to memory sub-system address mapping, in particular to memory sub-systems that include a memory sub-system address mapping component. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

A memory sub-system can include a number of tiers of memory, such as first tier memory that includes volatile memory (e.g., DRAM on an RDIMM module) and a second tier that includes non-volatile memory (e.g., storage class memory (SCM). The first tier memory can be used for kernel space, first tier user space, and as a cache to the second tier memory. The second tier memory can be used for second tier user space that is cacheable in the first tier memory.

The second tier memory can store applications with lower performance attributes, such as latency and bandwidth requirements, while the first tier memory can store applications with higher performance attributes. The first tier memory is coupled to the second tier memory via a first interface and the first tier memory is coupled to a host system via a second interface. The second interface that couples the first tier memory to the host system is configured to accommodate the higher performance attributes for the data stored in the first tier memory. The host system can access the second tier memory, which stores data having lower performance attributes, via the first tier memory. But these accesses use the second interface that accommodate higher performance, which is inefficient because accesses to the second tier memory store data that have lower performance attributes and do not need to higher performance provided by the second interface.

Aspects of the present disclosure address the above and other deficiencies by providing access for the host system to the second tier memory via the first interface. The memory sub-system includes a direct access to the second tier memory via a number of channels on the first interface. The first interface is configured to accommodate the lower performance attributes of the data stored in the second tier memory, while allowing the host to only use the second interface to access the first tier memory.

Figure 1:
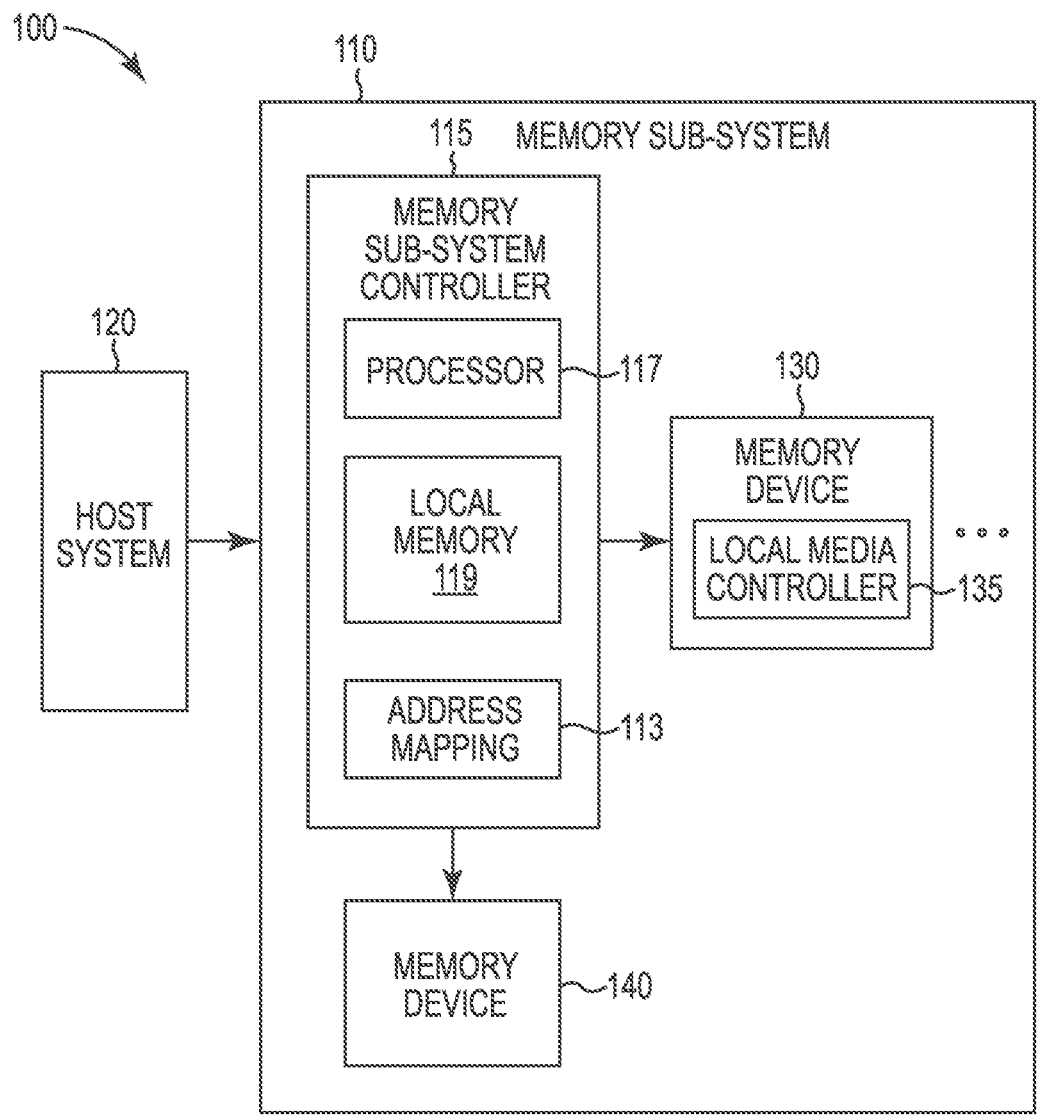
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, Compute Express Link (CXL) attached device, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include an address mapping component 113. Although not shown in FIG. 1 so as to not obfuscate the drawings, the address mapping component 113 can include various circuitry to facilitate address mapping for a memory sub-system and/or components of the memory sub-system, determining where to access and store data in the memory sub-system and/or components of the memory sub-system based on performance attributes of the data in the memory sub-system and/or components of the memory sub-system, and/or controlling address mapping for the memory sub-system and/or the components of the memory sub-system. In some embodiments, the address mapping component 113 can include special purpose circuitry in the form of an ASIC, FPGA, state machine, and/or other logic circuitry that can allow the address mapping component 113 to orchestrate and/or perform operations to selectively perform address mapping operations for the memory device 130 and/or the memory device 140 based on performance attributes of the data in the memory sub-system and/or components of the memory sub-system.

In some embodiments, the memory sub-system controller 115 includes at least a portion of the address mapping component 113. For example, the memory sub-system controller 115 can include a processor 117 (processing device) configured to execute instructions stored in local memory 119 for performing the operations described herein. In some embodiments, the address mapping component 113 is part of the host system 110, an application, or an operating system.

In a non-limiting example, an apparatus (e.g., the computing system 100) can include a memory sub-system address mapping component 113. The memory sub-system address mapping component 113 can be resident on the memory sub-system 110. As used herein, the term "resident on" refers to something that is physically located on a particular component. For example, the memory sub-system address mapping component 113 being "resident on" the memory sub-system 110 refers to a condition in which the hardware circuitry that comprises the memory sub-system address mapping component 113 is physically located on the memory sub-system 110. The term "resident on" can be used interchangeably with other terms such as "deployed on" or "located on," herein.

The memory sub-system address mapping component 113 can be configured to map data to a first address window that is only accessed by the host system via a first interface and to map data to a second address window that is accessed by the host system via a first interface or a second interface. The address mapping component 113 can be configured to map data to the first address window when the data is only being stored on the second tier memory, therefore the data can be accessed by the host system directly from the second tier memory via a first interface. The address mapping component 113 can be configured to map data to the second address window when the data can be stored on the first tier memory or the second tier memory, therefore the data can be accessed directly from the second tier memory via the first interface or directly from the first tier memory via the second interface.

The memory sub-system 115 can include memory device 140, which can be first tier memory, and memory device 130, which can be second tier memory. The first tier memory of memory device 140 can be used for kernel space, first tier user space, and as a cache to the second tier memory. The second tier memory of memory device 130 can be used second tier user space that is cacheable in the first tier memory.

Figure 2:
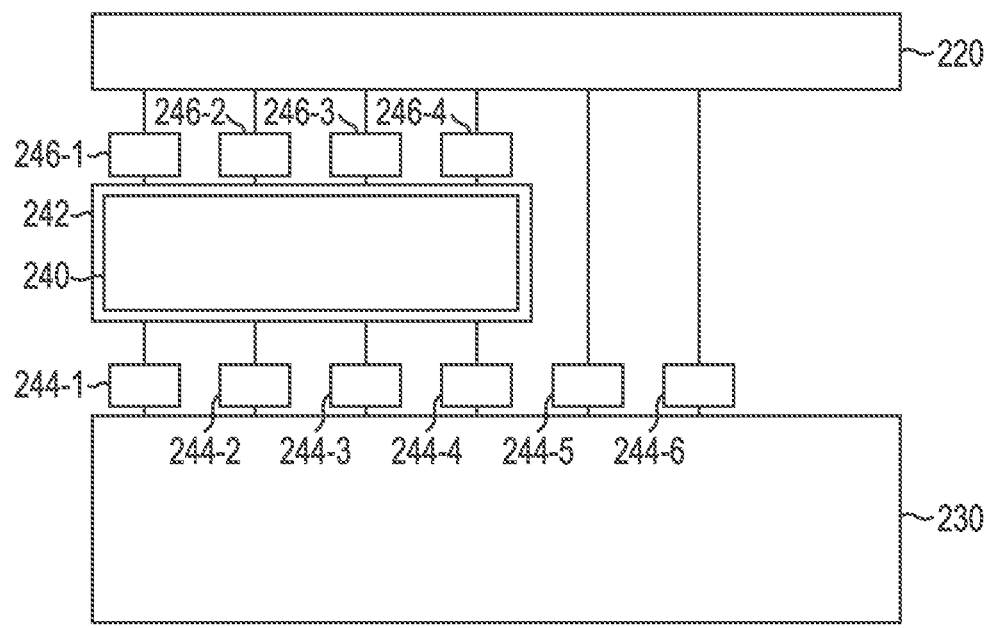
FIG. 2 illustrates an example computing system that includes a memory sub-system in accordance with some embodiments of the present disclosure.

The second tier memory of memory device 130 can store applications with lower performance attributes, such as latency and bandwidth requirements, while the first tier memory of memory device 140 can store application with higher performance attributes. The first tier memory of memory device 140 can be coupled to the second tier memory of memory device 130 via a first interface and the first tier memory of memory device 140 can be coupled to a host system via a second interface (as illustrated in FIG. 2). The second interface that couples the first tier memory of memory device 140 to the host system 120 is configured to accommodate the higher performance attributes for the data stored in the first tier memory of memory device 140, while the first interface can provide the host system 120 direct access to the second tier memory of memory device 130 to accommodate the lower performance attributes of the data stored in the second tier memory of memory device 130.

Memory sub-system address mapping component 113 can be configured to cause the memory sub-system 110 to access data located in a first address window at the second tier memory of memory device 130 via a first interface, access data located in a second address window at the first tier memory of memory device 140 via a second interface, and access data located in the second address window at the second tier memory of memory device 130 via the first interface. Data located in the first window can only be accessed only in the second tier memory of memory device 130 via the first interface. A portion of the first tier memory of memory device 140 can be configured to cache data stored in the second tier memory of memory device 130 and the memory sub-system address mapping component 113 can be configured to cause data located in the second address window to be transferred between the second tier memory of memory device 130 and the first tier memory of memory device 140 via the first interface.

The memory sub-system address mapping component 113 can be configured to check the first tier memory of memory device 140 to determine if data in the second address window that has been accessed in the second tier memory of memory device 130 via the first interface is also stored in the first tier memory of memory device 140. The memory sub-system address mapping component 113 can be configured to flush data from the first tier memory of memory device 140 to the second tier memory of memory device 130 in response to receiving a command to access data in the second address window in the second tier memory of memory device 130 when the data is also stored in the first tier memory of memory device 140.

Memory sub-system address mapping component 113 can be configured to cause data in a first address window to be written to the second tier memory of memory device 130 via a first interface. The data remains in the first address window on the second tier memory of memory device 130 in response to the data being associated with a lower performance attributes than data in a second address window and the data is remapped to the second address window in response to the data being associated with higher performance attributes than data in the first address window. The data can be cached in the first tier memory of memory device 140 via the first interface in response to the data being remapped to the second address window and the data in the second address window is accessed on the first tier memory of memory device 140 via a second interface.

The address mapping component 113 can be configured to access the data in the first address window on the second tier memory of memory device 130 without interacting with the first tier memory of memory device 140. The address mapping component 113 can be configured to access the data in the second address window on the second tier memory of memory device 130 after the data in the second address window on the first tier memory of memory device 140 is flushed to the second tier memory of memory device 130. The address mapping component 113 can be configured to access the data in the second address window on the second tier memory of memory device 130 in response to determining the data in the second address window is not located on the first tier memory of memory device 140.

FIG. 2 illustrates an example computing system that includes a memory sub-system in accordance with some embodiments of the present disclosure. FIG. 2 includes a number of interfaces 244-1, 244-2, 244-3, 244-4, 244-5, and 244-6 that couple component of the computing system together and allow the components of the computing system to communicate and access data through the number of interfaces 244-1, 244-2, 244-3, 244-4, 244-5, and 244-6. Interfaces 244-1, 244-2, 244-3, and 244-4 can couple memory device 230 to memory device 240 and interfaces 244-5 and 244-6 can coupled host system 220 to memory device 230. The number of interfaces 244-1, 244-2, 244-3, 244-4, 244-5, and 244-6 can be a Compute Express Link (CXL) interface. The computing system can be a Compute Express Link (CXL) compliant memory system (e.g., the memory system can include a PCIe/CXL interface). CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost.

CXL is designed to be an industry open standard interface for high-speed communications, as accelerators are increasingly used to complement CPUs in support of emerging applications such as artificial intelligence and machine learning. CXL technology is built on the peripheral component interconnect express (PCIe) infrastructure, leveraging PCIe physical and electrical interfaces to provide advanced protocol in areas such as input/output (I/O) protocol, memory protocol (e.g., initially allowing a host to share memory with an accelerator), and coherency interface.

FIG. 2 includes a number of interfaces 246-1, 246-2, 246-3, and 246-4, that couple components of the computing system together and allow the components of the computing system to communicate and access data through the number of interfaces 246-1, 246-2, 246-3, and 246-4. Interfaces 246-1, 246-2, 246-3, and 246-4 can couple host system 220 to memory device 240. Memory device 240 can be on a dual in-line memory module (DIMM) 242. Interfaces 246-1, 246-2, 246-3, and 246-4 can be NVDIMM-P interfaces, for example. Interfaces 244-1 and 246-1 can correspond to a first channel, interfaces 244-2 and 246-2 can correspond to a second channel, interfaces 244-3 and 246-3 can correspond to a third channel, interfaces 244-4 and 246-4 can correspond to a fourth channel, interface 244-5 can correspond to a fifth channel, and interface 244-6 can correspond to a sixth channel. Embodiments can include any number of interfaces (interfaces 244 and 246) and/or channels.

Memory device 230 can be configured to store data in a first address window that can be accessed by host system 220 via interfaces 244-5 and 244-6. Interfaces 244-5 and 244-6 can be CXL interfaces and provide performance attributes that correspond to the latency and bandwidth requirements of the data stored in memory device 230. Memory devices 230 and 240 can be configured to store data in a second address window that can be accessed via interfaces 246-1, 246-2, 246-3, and 246-4 when located on memory device 240 or via interfaces 244-5 and 244-6 when located on memory device 230. Memory 240 can be configured to cache data that is stored in memory device 230 and interfaces 244-1, 244-2, 244-3, and 233-4 can be configured to transfer data between memory devices 230 and 240.

When accessing data in the first address window, the host system 220 can access the data directly from memory device 230 via interfaces 244-5 and 244-6. The host system 220 and the address mapping component of the memory system does not have to interact with memory device 240 when accessing data in the first address window because data in the first address window can only be stored in memory device 230 and cannot be stored in memory device 240.

When accessing data in the second address window, the host system 220 can access data from memory device 230 via interfaces 244-5 and 244-6 and can access data from memory device 240 via interfaces 246-1, 246-2, 246-3, and 246-4. The data in the second address window can be stored in both memory device 230 and memory device 240. Therefore when accessing data in the second address window on memory device 230 via interfaces 244-5 and 244-6, the address mapping component can check to see if the data is also located in memory device 240 and if the data is located in memory device 240, the data from memory device 240 is flushed to memory device 230. Also, the data can be flushed from the memory device 240 to memory device 230 anytime the data in the second address window is accessed by the host system 220 via interfaces 244-5 and 244-6.

Data in the second address window stored in memory device 230 can also include a cache indicator (e.g., bits in metadata) that indicates whether the data has been cached in memory device 240. Therefore when the data in the second address window stored in memory device 230 is accessed by the host system 220 via interfaces 244-5 and 244-6, the cache indicator can be checked to determine if the data needs to be flushed from memory device 240 before sending the data from memory device 230 to host system 220. If the data has been cached in memory device 240, the memory device 240 can flush the data to memory device 230 before the data is sent to host system 220 from memory device 230. If the data has not been cached in memory device 240, the memory device 230 can send the data to host system 220 without interaction with memory device 240.

When data is first written to the memory device 230, the data is initially written in the first address window. If the data is associated with lower performance attributes, the address mapping is left unchanged because the data will not be cached in memory device 240 and the data can be accessed by the host system 220 in the first address window only via interfaces 244-5 and 244-6. If the data is associated with higher performance attributes, the address mapping is updated to the second address window because the data may be cached in memory device 240 and the data can be accessed by the host system 220 in the second address window on memory device 230 via interfaces 244-5 and 244-6 or on memory device 240 via interfaces 246-1, 246-2, 246-3, and 246-4 when cached to memory device 240.

Figure 3:
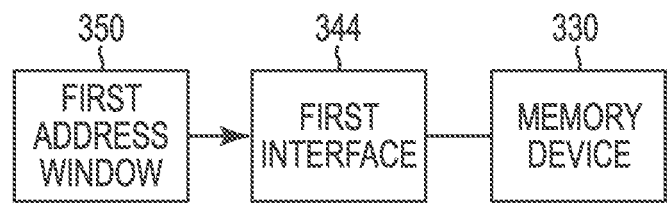
FIG. 3 is a block diagram of an example address window for memory sub-system address mapping in accordance with some embodiments of the present disclosure.

FIG. 3 is a block diagram of an example address window for memory sub-system address mapping in accordance with some embodiments of the present disclosure. FIG. 3 illustrates a first address window 350. The first address window 350 can be used when writing data to memory device 330 for the first time. Data in the first address window 350 can only be stored in memory device 330 and cannot be cached in another memory device, such as memory device 240 in FIG. 2. The data in the first address window 350 can be accessed on memory device 330 via interface 344.

Figure 4:
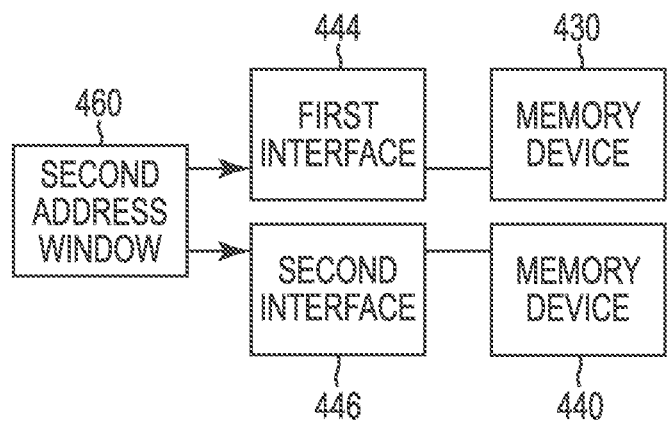
FIG. 4 is a block diagram of an example address window for memory sub-system address mapping in accordance with some embodiments of the present disclosure.

FIG. 4 is a block diagram of an example address window for memory sub-system address mapping in accordance with some embodiments of the present disclosure. FIG. 4 illustrates a second address window 460. The second address window 460 can be used when writing and/or accessing data in memory device 430 that can be cached in memory device 440 or when writing and/or accessing data in memory device 440 (e.g., kernel and/or user data in memory device 440 or data from memory device 430 that has been cached in memory device 440). Data that is initially in the first address window and can be cached in memory device 440 can be remapped to the second address window 460. The data in the second address window 460 can be accessed on memory device 430 via interface 444 or accessed on memory device 440 via interface 446.

Figure 5:
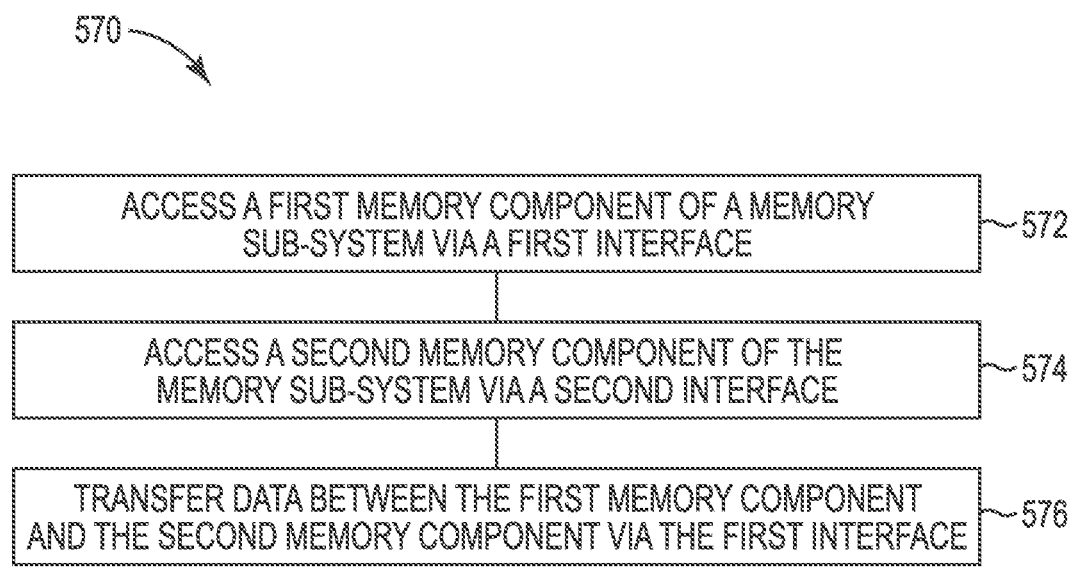
FIG. 5 is a flow diagram corresponding to a method for memory sub-system address mapping in accordance with some embodiments of the present disclosure.

FIG. 5 is flow diagram corresponding to a method 570 for address mapping in accordance with some embodiments of the present disclosure. The method 570 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 570 is performed by the address mapping component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 572, a first memory component of a memory sub-system can be accessed via a first interface. In some embodiments, the memory sub-system can be analogous to the memory sub-system 110 illustrated in FIG. 1.

At operation 574, a second memory component of the memory sub-system can be accessed via a second interface. At operation 576, data can be transferred between the first memory component and the second memory component via the first interface.

In some embodiments, the method 570 can include initially writing data in the first memory component via a first address window. The method 570 can include accessing data in the second memory component via a second address window in response to caching the data in first memory component to the second memory component, wherein caching the data in the first memory component to the second component includes changing an address for the data from the first address window to the second address window. The method 570 can include, in response to receiving a command to access data located in the first address window in the first memory component, checking the second memory component to determine if the data is also stored in the second memory component and flushing data from the second memory component to the first memory component in response to receiving the command to access data in the first memory component when the data is also stored in the second memory component.

Figure 6:
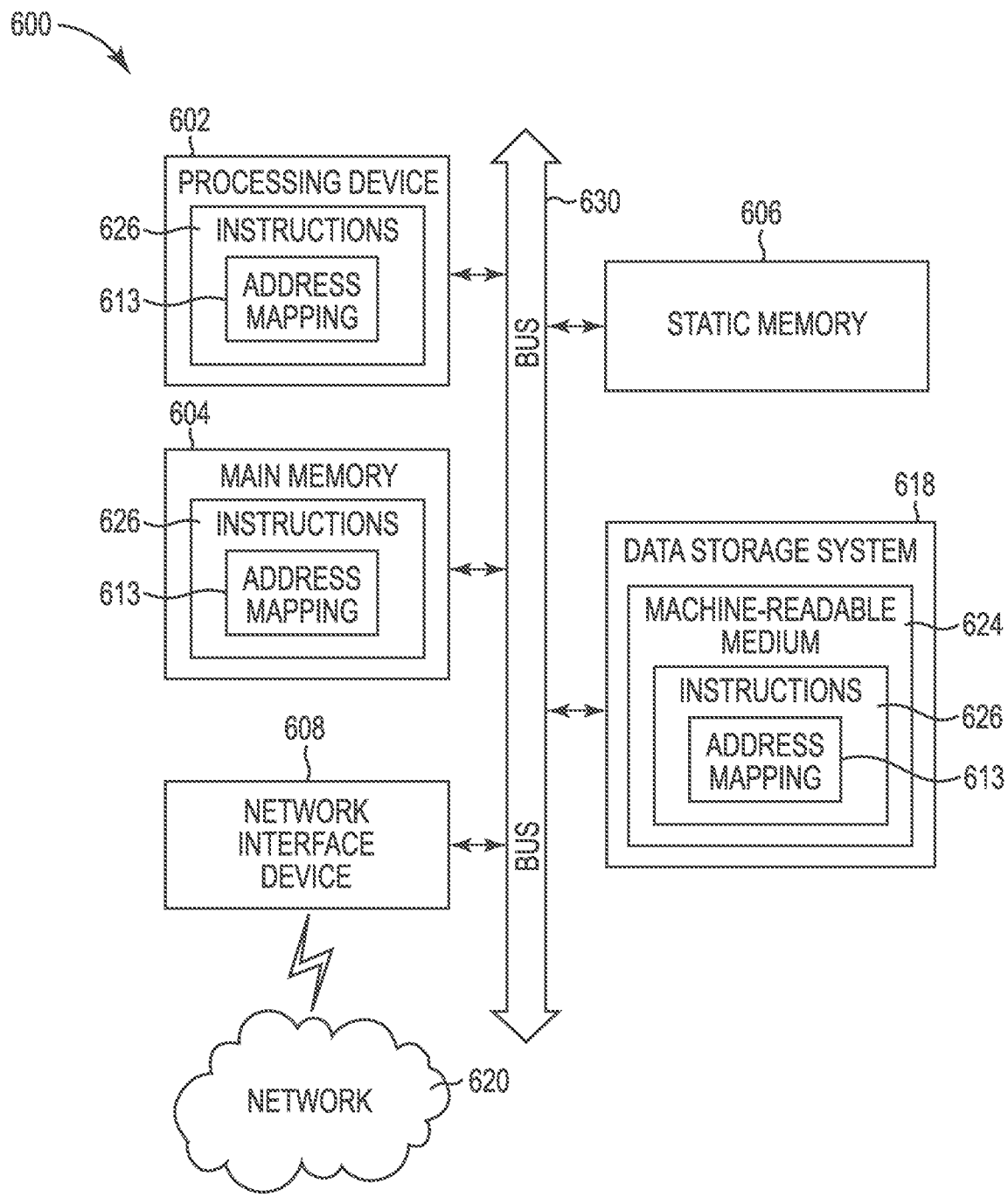
FIG. 6 is a block diagram of an example computer system in which embodiments of the present disclosure may operate.

FIG. 6 is a block diagram of an example computer system 600 in which embodiments of the present disclosure may operate. For example, FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the address mapping component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

The processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to an address mapping component 613 (e.g., the address mapping component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
    initially writing a first portion of data and a second portion of data to a first memory component of a memory sub-system in a first address window;
    changing an address mapping for the second portion of data from the first address window to a second address window in response to the second portion of data being cacheable in a second memory component of the memory sub-system;
    caching the second portion of data by transferring the second portion of data between the first memory component and the second memory component via a first interface;
    directly accessing the first portion of data and the second portion of data in the first memory component of the memory sub-system via the first interface; and directly accessing the second portion of data in the second memory component of the memory sub-system via a second interface.

2. The method of claim 1, further comprising accessing the second portion of data in the second memory component via the second address window in response to caching the second portion of data initially in the first memory component to the second memory component.

3. The method of claim 1, further comprising, in response to receiving a command to access the first portion of data located in the first address window in the first memory component, checking the second memory component to determine if the first portion of data is also stored in the second memory component.

4. The method of claim 3, further comprising flushing the first portion of data from the second memory component to the first memory component in response to receiving the command to access first portion of data in the first memory component when the data is also stored in the second memory component.

5. An apparatus, comprising:
a memory sub-system address mapping component configured to:
initially write a first portion of data and a second portion of data to a first memory component of a memory sub-system in a first address window;
change an address mapping for the second portion of data from the first address window to a second address window in response to the second portion of data being cacheable in a second memory component of the memory sub-system;
directly access the first portion of data located in the first address window at the first memory component of the memory sub-system via a first interface;
directly access the second portion data located in the second address window at the second memory component of the memory sub-system via a second interface in response to the second portion of data being cached in the second memory component; and
directly access the second portion data located in the second address window at the first memory component of the memory sub-system via the first interface.

6. The apparatus of claim 5, wherein the memory sub-system address mapping component is configured to transfer data located in the second address window between the first memory component and the second memory component via the first interface.

7. The apparatus of claim 5, wherein the memory sub-system address mapping component is configured to check the second memory component to determine if data in the second address window that has been accessed in the first memory component via the first interface is also stored in the second memory component.

8. The apparatus of claim 7, wherein the memory sub-system address mapping component is configured to flush data from the second memory component to the first memory component in response to receiving a command to access data in the second address window in the first memory component when the data is also stored in the second memory component.

9. The apparatus of claim 5, wherein a portion of the second memory component is configured to cache data stored in the first memory component.

10. The apparatus of claim 5, wherein data located in the second address window is associated with applications having higher performance attributes than data located in the first address window.

11. The apparatus of claim 5, wherein data located in first window is accessed only at the first memory component via the first interface.

12. An apparatus, comprising:
a memory sub-system address mapping component configured to:
write data to a first memory component of a memory sub-system in a first address window;
wherein the data remains in the first address window on the first memory component in response to the data being associated with a lower performance attribute than data in a second address window;
wherein the data in the first address window is directly accessed on the first memory component via a first interface;
wherein the data is remapped to the second address window in response to the data being associated with a higher performance attribute than data in the first address window;
wherein the data is cached in a second memory component in response to the data being remapped to the second address window; and
wherein the data in the second address window is directly accessed on the second memory device via a second interface.

13. The apparatus of claim 12, wherein the address mapping component is configured to access the data in the first address window on the first memory component without interacting with the second memory component.

14. The apparatus of claim 12, wherein the address mapping component is configured to access the data in the second address window on the first memory component after the data in the second address window on a second memory component is flushed to the first memory component.

15. The apparatus of claim 12, wherein the address mapping component is configured to access the data in the second address window on the first memory component in response to determining the data in the second address window is not located on a second memory component.

16. The apparatus of claim 12, wherein the performance attributes include latency and bandwidth.

* * * * *